(12) United States Patent
Andreev et al.

(10) Patent No.: US 6,735,600 B1
(45) Date of Patent: May 11, 2004

(54) EDITING PROTOCOL FOR FLEXIBLE SEARCH ENGINES

(75) Inventors: Alexander E. Andreev, San Jose, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 553 days.

(21) Appl. No.: 09/822,969

(22) Filed: Mar. 30, 2001

(51) Int. Cl.[7] .............................................. G06F 17/00
(52) U.S. Cl. ..................... 707/104.1; 707/102; 707/101
(58) Field of Search ................................ 707/1–3, 101, 707/104.1, 102

(56) References Cited

U.S. PATENT DOCUMENTS

| | | | | |
|---|---|---|---|---|
| 5,123,104 A | * | 6/1992 | Levine et al. ................... | 707/1 |
| 5,493,678 A | * | 2/1996 | Arcuri et al. ................... | 707/1 |
| 5,710,916 A | * | 1/1998 | Barbara et al. ................. | 707/9 |
| 5,758,356 A | * | 5/1998 | Hara et al. ................... | 707/202 |
| 6,553,370 B1 | * | 4/2003 | Andreev et al. ................ | 707/3 |
| 6,564,211 B1 | * | 5/2003 | Andreev et al. ................ | 707/3 |

OTHER PUBLICATIONS

Frederickson "Data structures for on–line updating of minimum spanning trees", ACM 1983, pp. 252–257.*

Goodrich et al "Dynamic trees and dynamic point location", ACM 1991, pp. 523–533.*

Cheetham et al "Adaptive structuring of binary search trees using conditional rotations", IEEE 1993, pp. 695–704.*

Evans et al "Restructuring ordered binary trees", Proceedings of the eleventh annual ACM–SIAM symposium on discrete algorithms, Feb. 2000, pp. 477–486.*

Eikerling et al "Automatic structuring and optimization of hierarchical designs", IEEE 1996, 6 pages.*

Cohen et al "Dynamic expression trees and their applications", Proceedings of the second annual ACM–SIAM symposium on discrete algorithms, Mar. 1991, pp. 52–61.*

* cited by examiner

Primary Examiner—Uyen Le
(74) Attorney, Agent, or Firm—Westman, Champlin & Kelly

(57) ABSTRACT

Entries are added or deleted on a search tree starting with a selected vertex on an identified level of the tree. If the level of the selected vertex is the bottom level the entry is inserted to or deleted from the selected vertex. If the level of the selected vertex is not the bottom level, the entries on the child vertices of the selected vertex are redistributed so that the child vertex having a maximal index contains a predetermined number of entries. If the level of the child vertex is the bottom level the entry is inserted to or deleted from the child vertex. Otherwise, the process repeats, using the child and grandchild vertices, until the correct level is reached.

18 Claims, 5 Drawing Sheets

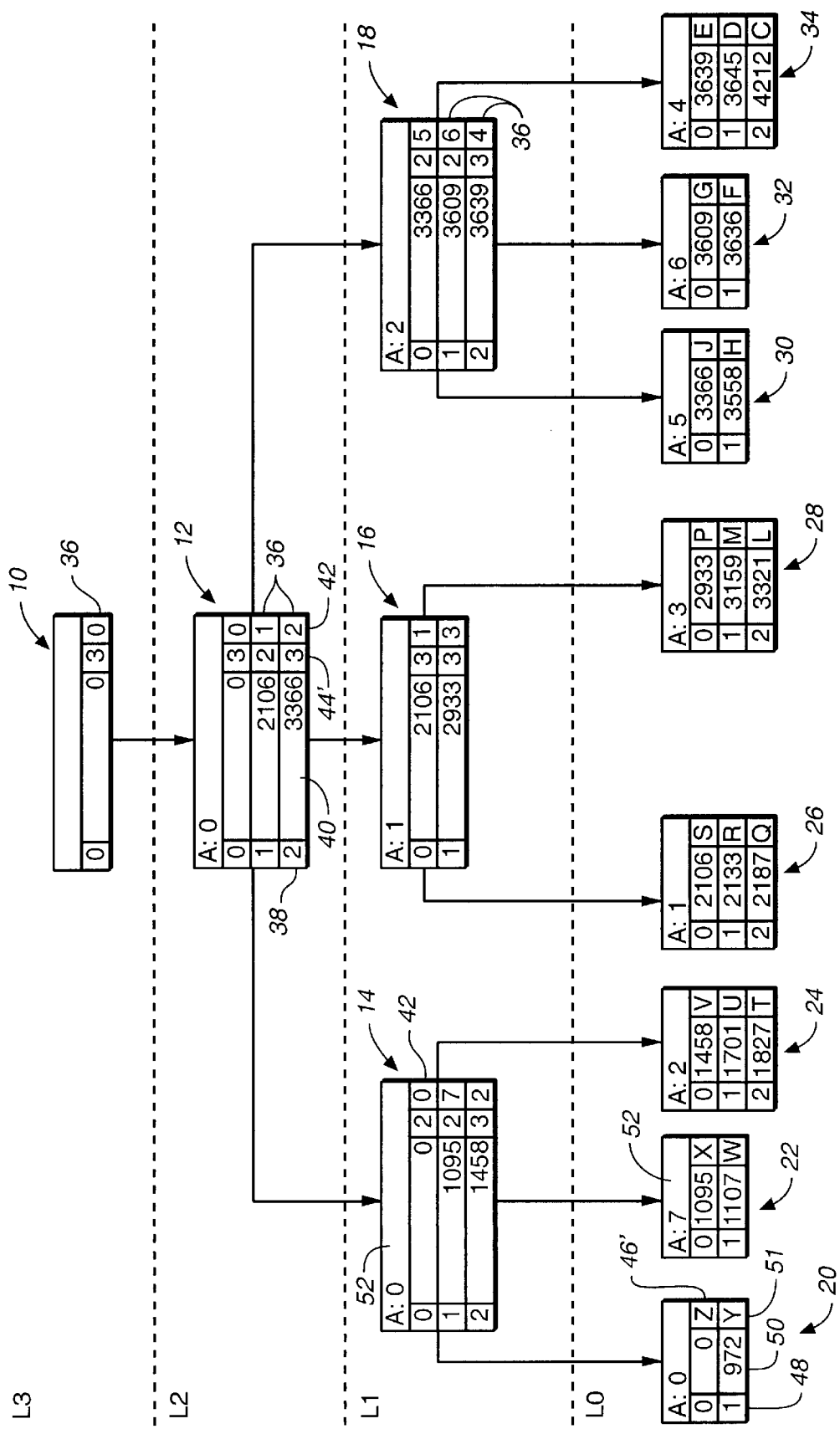
FIG._1

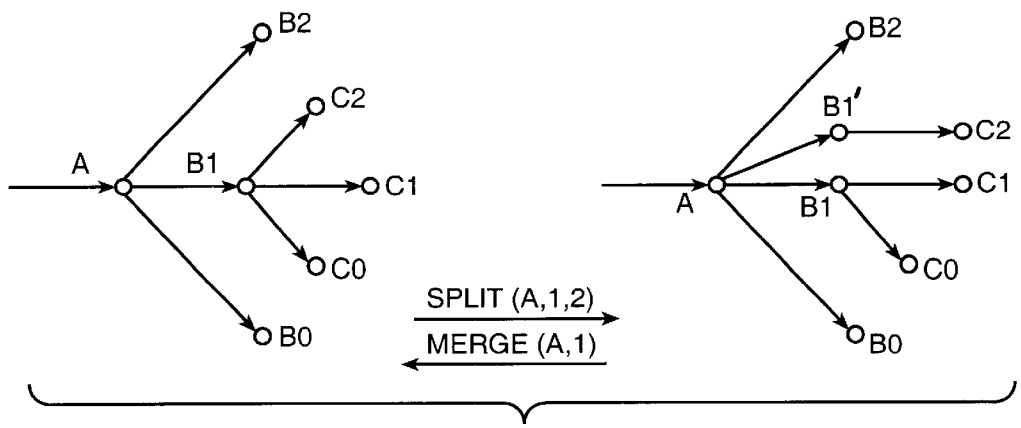
FIG._2
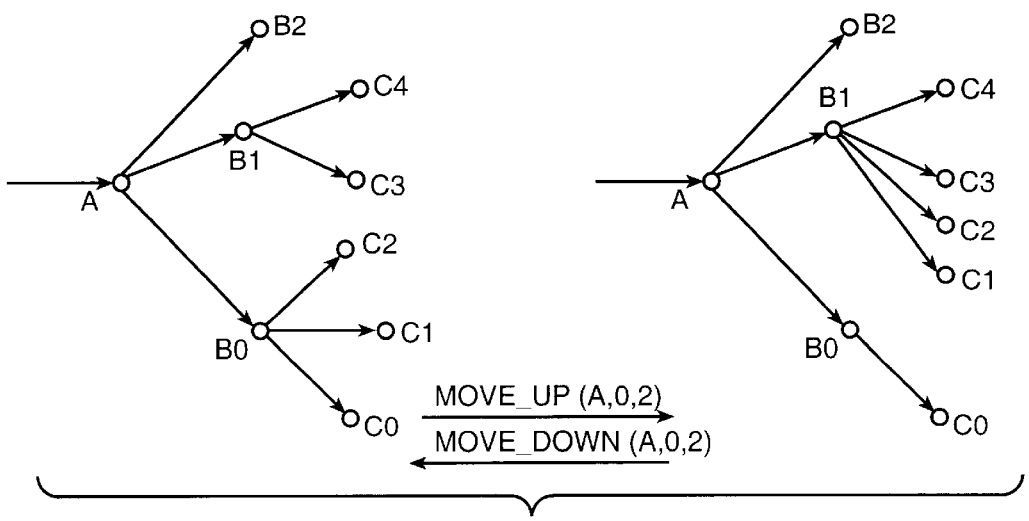
FIG._3

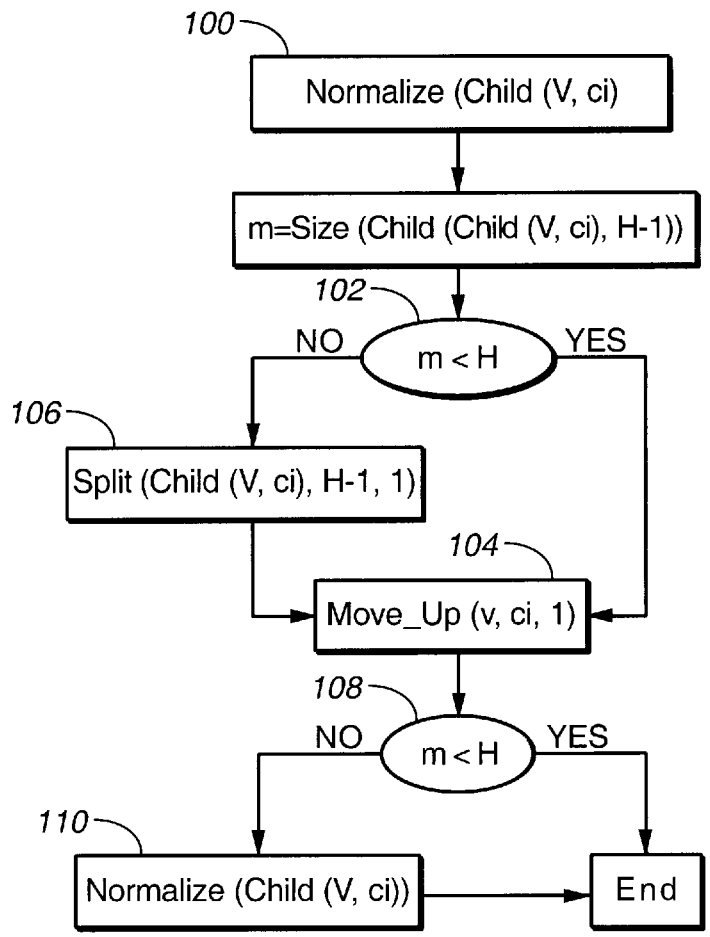
FIG._4
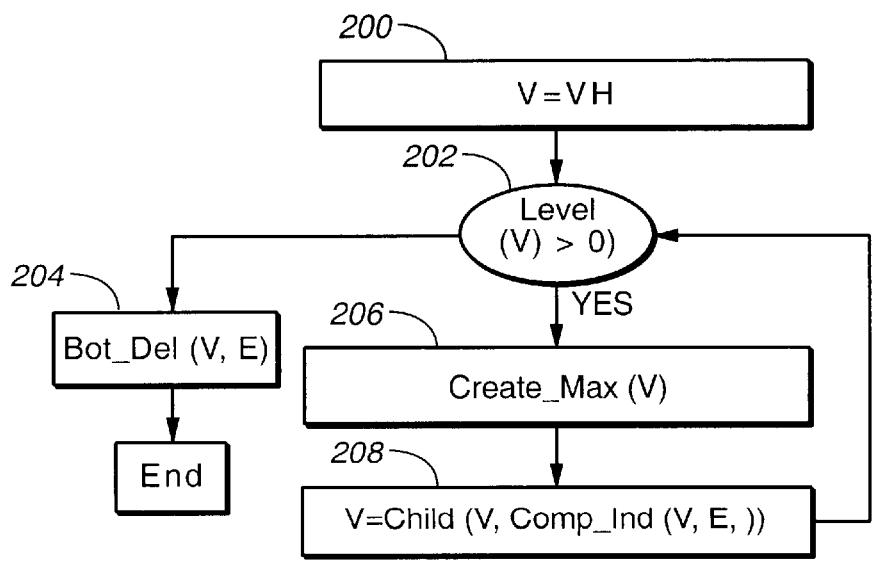
FIG._6

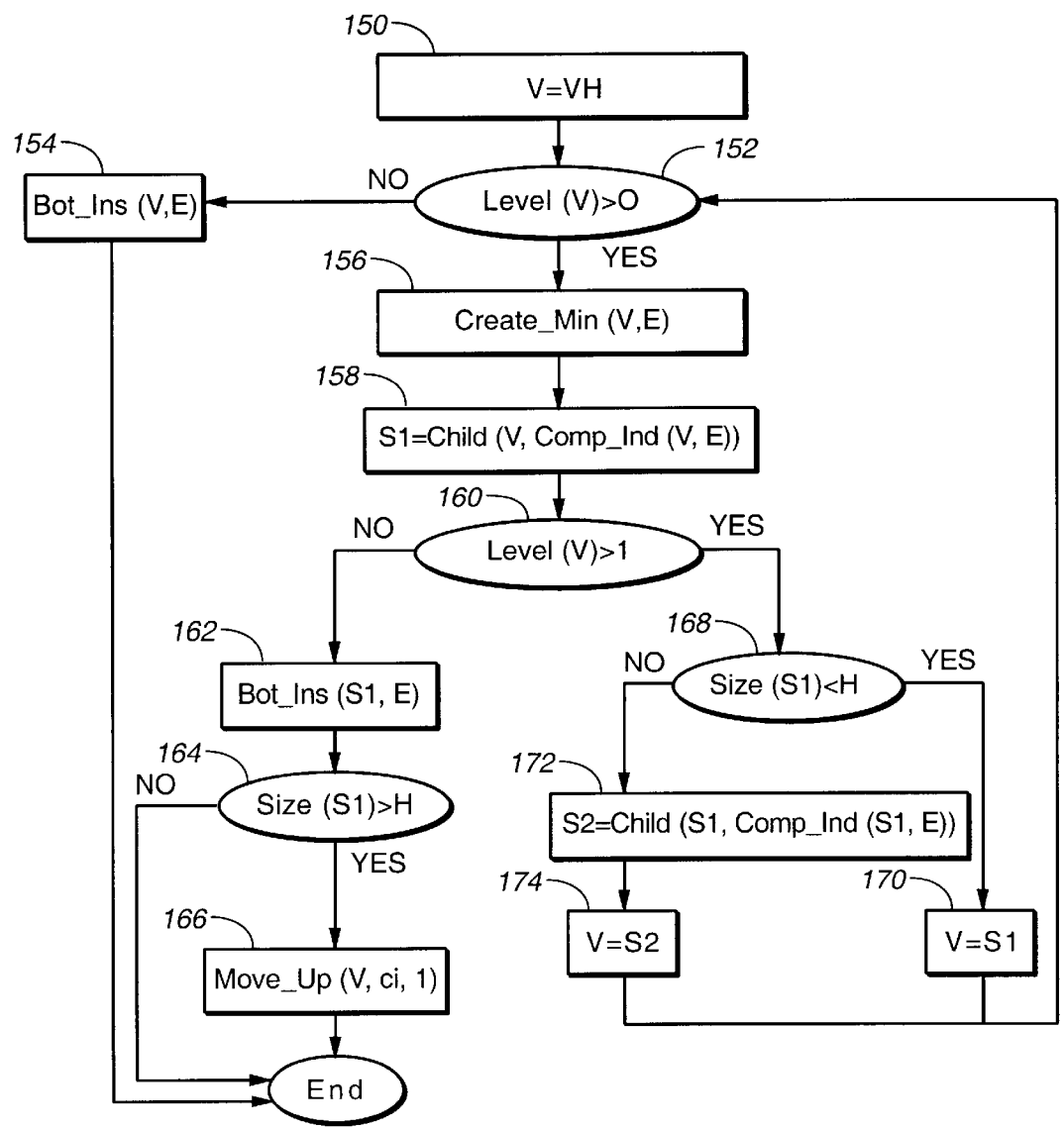
FIG._5

EDITING PROTOCOL FOR FLEXIBLE SEARCH ENGINES

CROSS REFERENCE TO RELATED APPLICATIONS

The present application is related to U.S. application Ser. No. 09/679,209 for "Fast Flexible Search Engine for Longest Prefix Match" filed Oct. 4, 2000, now U.S. Pat. No. 6,564,211 granted May 13, 2003, and is related to U.S. application Ser. No. 09/679,313 filed Oct. 4, 2000 for "Flexible Search Engine having Sorted Binary Search Tree for Perfect Match", now U.S. Pat. No. 6,553,370 granted Apr. 22, 2003, both by Alexander A. Andreev and Ranko Scepanovic and assigned to the same Assignee as the present invention, both of which are specifically incorporated herein by reference.

FIELD OF THE INVENTION

This invention relates to search engines for searching large tables of data, and particularly to an improved protocol for insertion and deletion of items to the search table.

BACKGROUND OF THE INVENTION

Lookup procedures are a major source of bottlenecks in high-performance compilers and routers, such as compilers used to search databases of cell designs for designing integrated circuits, and compilers used to lookup internet addresses (URLs) in network applications. Recently, there has been renewed interest in binary search trees, largely because the worst-case time required for basic dynamic set operations is O(log n), where n is the number of nodes or vertices in the tree. In application Ser. No. 09/679,313, we describe a sorted binary search tree that inherits the favorable attributes of prior binary search trees, but provides simpler solutions for insertion and deletion functions. However, that search tree requires considerable memory allocation, particularly for performing insertion and deletion functions. The insertion and deletion functions are important to the search tree because they maintain equal length to all search paths through the tree.

The present invention is directed to an improvement of the search tree described in our aforementioned applications, and particularly to an improved insertion and deletion technique that reduces memory requirements for the tree.

SUMMARY OF THE INVENTION

One aspect of the present invention is a process for changing the number of entries in a search tree by inserting or deleting entries into or from a vertex of a bottom level. The search tress has a top level, a bottom level and at least one hierarchy level between the top level and the bottom level. The bottom level has a plurality of vertices each containing at least one entry, with each bottom level vertex being a child vertex to a vertex of a hierarchy level and each vertex in the top and hierarchy levels being a parent to at least one vertex in a lower level. A vertex is selected and its level in the tree identified. If the level of the selected vertex is not the bottom level, the entries in the child vertices of the selected vertex are redistributed so that the child vertex having a maximal index contains a predetermined number of entries. In the case of a deletion, the predetermined number equals the maximum number H that a vertex may contain. In the case of an insertion, the predetermined number is less than the maximum number and is preferably H−1. If the level of the child vertex is the bottom level the entry is inserted or deleted on the child vertex having the maximal index. If the level of the selected vertex is the bottom level the entry is inserted or deleted on the selected vertex.

In preferred forms of the invention, the process of deleting an entry from the search tree is performed by repeating the steps of the process using the child vertex having the maximal index found during one iteration for the selected vertex during the next iteration, until a child vertex is found in the bottom level.

In preferred forms of the invention, if the level of the child vertex is not the bottom level, the process of inserting an entry to the search tree is includes redistributing entries between grandchild vertices of the selected vertex that are children of the child vertex having the maximal index so that the grandchild vertex having a maximal index contains the predetermined number of entries. If the level of the grandchild vertex is the bottom level the entry is inserted on the grandchild vertex having the maximal index. If the level of the grandchild vertex is not the bottom vertex, the process is repeated using the child or grandchild vertex having the maximal index found during one iteration for the selected vertex during the next iteration, until a child or grandchild vertex is found in the bottom level.

The selection of the child or grandchild vertex as the selected vertex depends on whether the child vertex contains the maximum number (H) of entries. If the child vertex contains less than the maximum number of entries (H−1), the process is repeated using the child vertex during the next iteration. If the child vertex contains the maximum number of entries (H), the process is repeated using the grandchild vertex during the next iteration.

Another aspect of the present invention resides in a search tree that includes instrumentalities to carry out the process of the invention.

Another aspect of the present invention resides in the provision of computer readable program code that is embedded in a computer usable medium. The computer readable program code includes computer code that causes a computer to define the search tree and computer code that causes the computer to insert and delete entries to and from bottom vertices of the tree.

BRIEF DESCRIPTION OF THE DRAWINGS

FIG. 1 is a diagram of a balanced search tree in which the present invention is used.

FIG. 2 illustrates examples of Split and Merge edit processes used in the present invention.

FIG. 3 illustrates examples of Move_Up and Move_Down processes used in the present invention.

FIG. 4 is a flow chart of a redistribution process employed in an optional program code of the present invention.

FIG. 5 is a flow chart of an insertion process in accordance with the present invention.

FIG. 6 is a flow chart of a deletion process in accordance with the present invention.

DETAILED DESCRIPTION OF THE PREFERRED EMBODIMENT

Figure 7:
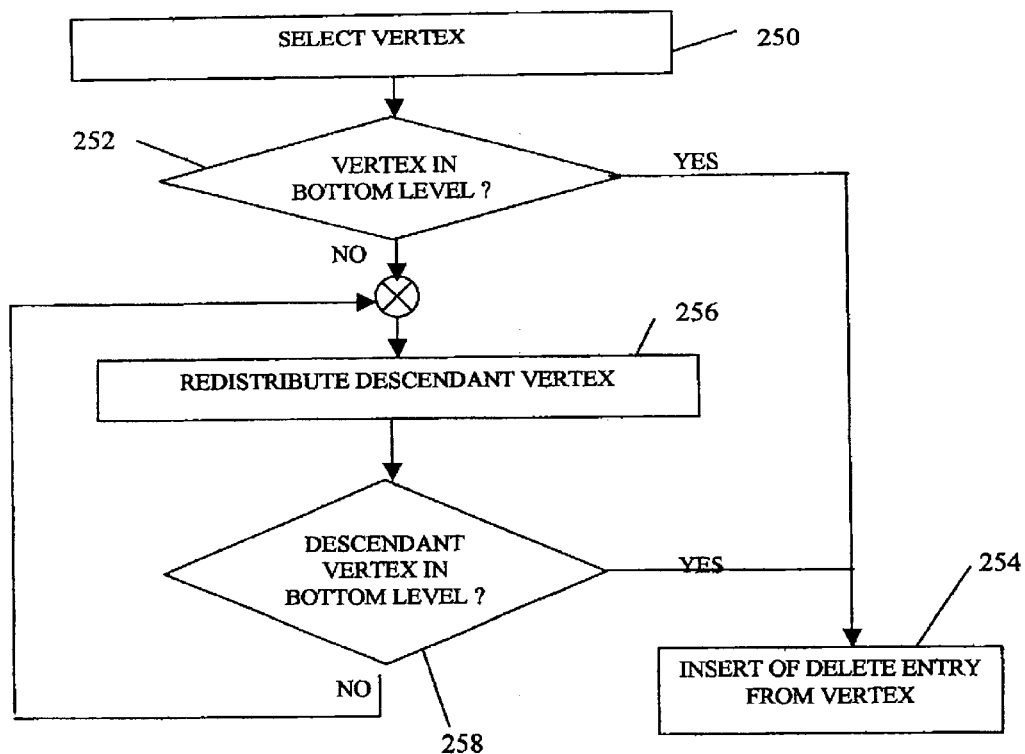
FIG. 7 is a flow chart illustrating the general process of the invention as carried out by a program code of the present invention.

FIG. 1 is a diagram of the search tree described in application Ser. No. 09/679,313, and illustrates the environment of the present invention. The tree includes a top or root vertex 10 and a plurality of hierarchy vertices 12–18 arranged in a plurality of levels L3–L1, and a bottom level L0 containing a plurality of bottom vertices 20–34. There may be any number of levels, each containing vertices such that the vertices of a lower level are children to the vertices of the next higher level. Root vertex 10 and each hierarchy vertex 12–18 contains entries 36, with the root vertex containing a single entry 36 that is the entry point for searches to the tree. Each entry 36 contains a key field 40, a child vertex address field 42, and a designator field 44. The keys 40 are copies of the highest-valued key or entry of each child vertex in the next lower level. The designator field entry 44 identifies the number of entries in the respective child vertex, and the child vertex address field 42 identifies the address 52 of the child vertex containing the entry. The bottom vertices contain keys 50 and associated data entries 51.

In application Ser. No. 09/679,313, the number of entries in any hierarchy or bottom vertex is limited to between k and 2k−1, where k is an integer greater than or equal to 2 ($k \geq 2$). In the present invention, the maximum number of entries in a vertex on a level other than top level L3 is H and the minimum number is H−1, where H is an integer greater than or equal to 2 ($H \geq 2$). The maximum number of entries in the vertex on top level L0 is TH and the minimum number is one. The capacity CAP of the tree is the maximum number of entries in the bottom level.

Each level contains a maximum of LC(i) vertices, except the top level L3 contains one vertex. The capacity CAP of the tree is one more than the maximum number of vertices in the bottom level minus 1 (LC(0)−1), times the minimum number of entries in a vertex (H−1): $CAP \leq 1+(H-1)\cdot(LC(0)-1)$. The capacity cap of a level (other than the top level) is $cap \leq 1+(H-1)\cdot(LC(i)-1)$. Each lower level (i−1) contains no more vertices as the maximum number of entries as in the next higher level i: $LC(i-1) \leq 1+(H-1)\cdot(LC(i)-1)$. The number of levels NL is the minimum number for which cap (NL−2,H,CAP)≤TH, where NL−2 is the level below the top level (level L2 in FIG. 1). The maximum number in vertices in each level, other than the top level, is LC(i)=cap(i,H,cap) for i=0, 1, . . . , NL−2.

In addition, each level, other than the top level, has no more than one vertex containing less than H−1 entries. Therefore, normally vertices contain H or H−1 entries.

To maintain equal lengths of the paths, the tree may need to be re-structured as entries are added or deleted. This is accomplished through selective splitting and merging of vertices. For example, if the entry containing key "3609" is deleted from vertex 32, it would be necessary to move key "3639" from vertex 34 to vertex 32 to avoid the violation of the rule concerning minimum size of vertices. In addition, an entry in vertex 18 would need to be changed to reflect the change of top keys in both child vertices 32 and 34. It will be appreciated that if all of the child vertices 30–34 contained the minimum number of entries, the deletion of an entry from one of those vertices would require a merging of entries to reduce the number of vertices.

Similarly, insertion of entries may require operations of split and merger. For example, while an insertion to a bottom vertex that does not already contain the maximum number of entries may be accomplished without significant change to the tree, an insertion to a bottom vertex already containing the maximum number of entries may require splitting that vertex, or even of a parent vertex.

While the process described in the aforementioned application is quite effective and exhibits minimal latency, it also requires considerable memory allocation. The present invention is directed to protocols for editing the binary search tree of a search engine to permit insertion and deletion operations with minimal memory allocation and decreased frequency of such operations.

The present invention is directed to an improved edit protocol for insertion and deletion operations for use in the search engines of the binary search trees described in our aforementioned applications. The protocol reduces the frequency of insertion/deletion operations with nearly zero area increase, and hence provides an increased capacity of the engine. There are seven basic functions or procedures performed during insert and delete operations: Split, Merge, Move_Up, Move_Down, Normalize, Create_Max and Create_Min.

1. Split Function

The Split function has a format of Split(V,ind,p), where V is the vertex whose child vertex is being split, ind is the index of the child vertex being split, and p is a parameter that is smaller than the number of entries in the ind-th child vertex. This operation creates a new child vertex of vertex V and inserts it at an (ind+1)-th position. The entries in the ind-th child vertex are split between it and the new (ind+1)-th child vertex. The ind-th child vertex obtains the lower p entries, whereas the (ind+1)-th child vertex obtains the remaining entries (commencing with p+1). For example, if child vertex i contains 3 entries (where H=3), a Split(V,i,2) operation will create a new child vertex i+1, and will split the three entries previously in child vertex i so that child vertex i contains entry p and p−1 and child vertex i+1 contains entry p+1. This is diagrammatically illustrated in FIG. 2 where the operation Split(A,1,2) is performed to split child vertex $B_1$ that contained three entries $C_0$, $C_1$ and $C_2$ into two vertices $B_1$ and $B_1'$ with vertex $B_1$ containing entries $C_0$ and $C_1$ and vertex $B_1'$ containing entry $C_2$.

2. Merge Function

The Merge function has a format of Merge(V,ind), where V is the vertex having two child vertices being merged and ind is the index of the child vertex into which entries of the next higher child vertex are being merged. This operation is the reverse of the Split operation and eliminates the (ind+1)-th child vertex of vertex V and inserts its entries into the ind-th child vertex. For example, if child vertex i contains 2 entries and child index i+1 contains 1 entry (where H=3), a Merge(V,i) operation will insert the entry previously found in child vertex i+1 and insert it in child vertex i, and will eliminate child vertex i+1. This is also diagrammatically illustrated in FIG. 2 where the operation Merge(A,1) is performed to merge child vertex $B_1$ that contained two entries $C_0$ and $C_1$ with child vertex $B_1'$ that contained entry $C_2$ into a single vertex $B_1$ containing entries $C_0$, $C_1$ and $C_2$.

3. Move_Up Function

The Move_Up function has a format of Move_Up(V, ind,p), where V is the vertex whose child vertices contain entries that are being moved from one child vertex to another, ind is the index of the child vertex whose entries are being moved to child vertex (ind+1), and p is a parameter that is smaller than the number of entries in the ind-th child vertex. This operation moves p entries from the ind-th child vertex to the (ind+1)-th child vertex of vertex V. For example, if child vertex i contains 3 entries (where H=3), a Move_Up(V,i,2) operation will move the two highest entries in child vertex i to child vertex i+1. This is diagrammatically illustrated in FIG. 3 where the operation Move_Up(A,0,2) is performed to move entries $C_1$ and $C_2$ from vertex $B_0$ into vertex $B_1$.

4. Move_Down Function

The Move_Down function has a format of Move_Down (V,ind,p), where V is the vertex whose child vertices contain entries that are being moved from one child vertex to another, ind is the index of the child vertex which will receive entries from child vertex (ind+1), and p is a parameter that is smaller than the number of entries in the (ind+1)-th child vertex. This operation moves p lower entries from the (ind+1)-th child vertex to the ind-th child vertex of vertex V. For example, if child vertex i+1 contains 3 entries (where H=3), a Move_Down(V,i,2) operation will move the two lowest entries in child vertex i+1 to child vertex i. This is also diagrammatically illustrated in FIG. 3 where the operation Move_Down(A,0,2) is performed to move entries $C_1$ and $C_2$ from vertex $B_1$ into vertex $B_0$.

5. Normalize Function

The Normalize function has a format of Normalize(V), where V is a vertex that is not in the bottom level. The goal of this function is to distribute entries between the child vertices of vertex V so that the size of the child vertices, Size(Child(V,i)), does not increase as a function of the child index i, and the number of child vertices having H−1 entries is maximized. This function is accomplished by identifying SumSize(V) as the total of the number of entries in all child vertices of vertex V and identifying a parameter d.

If SumSize(V)$\geq$H·(H−1), set d=SumSize(V)−H·(H−1)

If (H−1)·(H−1)$\leq$SumSize(V)<H·(H−1), set d=SumSize(V)−(H−1)·(H−1).

If SumSize(V)<(H−1)·(H−1), set d=0.

Starting at the child vertex having the lowest index, i=0, the size of each child, in terms of the number of entries, is examined. More particularly, if the sum of the sizes of the children vertices at indexes i and i+1, where i<d, is greater than H, a Move_Down procedure is performed to move the lower p entries from the child vertex whose index is i+1 to child vertex whose index is i, where p is equal to H minus the size of child vertex i:

if Size(Child(V,i))+Size(Child(V,i+1))>H
        perform Move_Down(V,i,H−Size(Child(V,i))).

If the sum of the sizes of the children vertices i and i+1, where i<d, is equal to H, a Merge procedure is performed to move all entries from child vertex i+1 to child vertex i, and delete child vertex i+1:

if Size(Child(V,i))+Size(Child(V,i+1))==H,
        Merge(V,i).

If the size of child vertex i is equal to H−1, the process continues to the next child vertex i+1.

For each child i, where i is smaller than the size of vertex V minus 1, i<Size(V)−1, a similar set of operations can be performed:

if Size(Child(V,i))>H−1, Split (V,i,H−1);
    if Size(Child(V,i))+Size(Child(V,i+1))>H−1, Move-Down(V,i,H−1−Size(Child(V,i)));
    if Size(Child(V,i))+Size(Child(V,i+1))==H−1, Merge(V,i);
    if Size(Child(V,i))==H−1, the level i is advanced by one.

The process continues for all levels above the bottom level and the entries in each child vertex are re-distributed. The result of the re-distribution is that the first d child vertices of a vertex V will each have H entries. All other child vertices will have H−1 entries, with the possible exception of the last vertex. In the event that SumSize(V)<(H−1)·(H−1), the last child may have less than H−1 entries.

6. Create_Max Function.

The Create_Max function has the format Create_Max (V,E), where E is the search object and V is a vertex that is not in the bottom level. There are two cases. A "regular" case is where vertex V has H child vertices each having at least H−1 entries, and an "exception" case where either vertex V has less than H child vertices or vertex V has H child vertices but the last of them contains less than H−1 entries. The goal of this function is to distribute the entries of the child vertices so that the last or maximal child vertex, whose index is Comp_Ind(V,E) has H entries. One exemplary algorithm to perform this function is described as follows:

For the "regular" case where vertex V has H child vertices each having H−1 entries, for (i=0;i<Size(V)−1;i++), Move_Down(V,i,H−Size(Child(V,i))), and
    Merge(V,Size(V)−1).

The result will be that all child vertices of vertex V will have H entries.

For the "exception" case where some p-th child vertex of vertex V has H entries, two conditions can occur:

a) If p<ci, where ci is Comp_Ind(V,E), then
        for(i=ci;i<p;i++), Move_Down(V,i,1); or
    b) If p>ci, then
        for (i=p;i<ci;i++), Move_Up(V,i,1).

(If p=ci, the maximum child vertex has less than H−1 entries, which is one of the next exception cases.)

In the "exception" case, where Vertex V has less than H child vertices, or has H child vertices but the maximum child vertex has less than H−1 entries. This can only occur at the last vertex of the level, and all child vertices, except the last, will have either H or H+1 entries. For (i=0;i<Size(V);i++), do if (Size(Child(V,i))+Size(Child(V,i+1))>H, Move_Down (V,i,H−Size(Child(V,i))), or
    otherwise, Merge(V,i).

In this "exception" case, if Comp_Ind(V,E) is the last vertex index of the level, the original goal might not be achieved. More particularly, the Comp_Ind(V,E)-th vertex might not contain H entries. In this case, however, this is an acceptable result.

7. Create_Min Function.

The Create_Min function has the format Create_Min(V, E), where E is the search object and V is a vertex that is not in the bottom level. There are two cases. A "regular" case is where vertex V has H−1 child vertices each having at least H−1 entries, and an "exception" case where either vertex V has less than H−1 child vertices or vertex V has H−1 child vertices but the last of them contains less than H−1 entries. The goal of this function is to distribute the entries of the child vertices so that either S1 or S2 has H−1 entries, where S1 is the child of vertex V having the maximum index and S2 is the child of vertex S1 having the maximum index:

S1=Child(V,Comp_Ind(V,E)), and
    S2=Child(S1,Comp_Ind(S1,E)).

One exemplary algorithm to perform this function is described as follows, where p is the minimal index of the child vertex containing H−1 entries:

for (i=p−1;i>ci;i—), Move_Up(V,i,1).

If p<Size(V)−1, that is, p is smaller than the size of vertex V minus 1 and vertex V has at least two child vertices with H+1 entries, for (i=p;i$\geq$ci;i—), Move_Up(V,i,1).

This redistributes the entries so that Comp_Ind(V,E) is either ci or ci+1, and the Child(V,Comp_Ind(V,E)) vertex has H−1 entries.

If p==Size(V)−1, only the Comp_Ind(V,E)+1 child of vertex V has H−1 entries. If the level of vertex V is at least 2, the process illustrated in FIG. 4 is applied. More particularly, the procedure Normalize(Child(V,Comp_Ind(V,E))) is performed at step 100. If Size(Child(Child(V, Comp_Ind(V,E)),H−1) is smaller than the maximum number of entries in a vertex (H), as determined at step 102, the Move_Up(V,Comp_Ind(V,E),1) procedure is carried out at step 104. Otherwise, the Split(Child(V,Comp_Ind(V,E)),H−1,1) procedure is carried out at step 106 before carrying out the procedure at step 104. Now, if Size(Child(Child(V, Comp_Ind(V,E)),H−1)) is smaller than the maximum number of entries in a vertex (H), as determined at step 108, the process ends. Otherwise, a Normalize(Child(V,Comp_Ind(V,E)) is carried out at step 110.

The result of the process of FIG. 4 is the redistribution of the entries so that Comp_Ind(V,E) is either ci or ci+1 and the grandchild vertex Child(Child(V,ci+1,0) has H−1 entries. The Child(V,ci) vertex has H−1 entries (if Size(Child(Child(V,ci),H−1))<H, or each of its child vertices (grandchildren to vertex V) has H−1 entries (if Size(Child(Child(V,ci)),H−1))==H.

If S1=Child(V,Comp_Ind(V,E)) and S2=Child(S1, Comp_Ind(S1,E)), then either
Comp_Ind(V,E)=ci, or
Comp_Ind(V,E)=ci+1 and Comp_Ind(S1,E)=0.

In the first case if Size(Child(Child(V,ci)),H−1))<H, S1 has H−1 entries. If Size(Child(Child(V,ci)),H−1))==H, then S2 has H−1 entries (because any child of S1 has H−1 entries in this case). In the second case, S2 has H−1 entries.

Insertion Procedure

FIG. 5 is a flow chart illustrating the process of inserting an object E into a bottom vertex VB. The process commences at step 150 at the top or root of the tree VH. At step 152, level number is identified. If the level number is 0, indicating that the level is the bottom level (meaning that the tree is a single level tree), a BOT_INS(V,E) process is performed at step 154 to insert object E into bottom vertex VB in the manner described in application Ser. No. 09/679,313, and the process ends. If the current level V is not the bottom level at step 152, then a Create_Min(VE) operation is performed at step 156 to distribute the entries in either a child vertex S1 or a grandchild vertex S2 so that the child or grandchild vertex has H−1 entries. Vertex S1 is the child of vertex V having a maximal index number. Vertex S2 is the child of vertex S1 having a maximal index number. At step 160, a determination is made as to whether the level of vertex V is greater than level 1. If it is not, meaning the current level is level 1, there can be no grandchild vertex, and the process continues at step 162 to insert the object into vertex S1, which is in the bottom level. At step 164, a determination is made whether the size of the bottom vertex S1 is greater than H. If Size(S1)≦H, the process ends. Otherwise, a Move_Up process is performed at step 166 to move one entry from the child index next lower from the maximal index into the child vertex having the maximal index, i.e., Move_Up(V,ci,1). Thus, for vertex V in the level under consideration, one entry is moved from the child vertex whose index is ci−1 to the child vertex whose index is ci.

If at step 160, the level of vertex V is greater than 1, meaning there is a grandchild level, a determination is made at step 168 whether the size of child vertex S1 is smaller than H. If the size of vertex S1 is smaller than H (Size(S1)<H), vertex S1 is set to vertex V and the process loops back to step 152 to repeat using vertex S1 as vertex V. Otherwise, if the size of vertex S1 is not smaller than H, Size(S1)≧H, the grandchild vertex S2 is identified at step 172, which is the child of vertex S1 having the maximal index. At step 174, vertex S1 is set to V, and the process loops back to step 152 to repeat the process using vertex S2 for vertex V. The process continues until either the bottom level is reached at step 152, or level 1 is reached at step 160, in which case the object is inserted into the bottom level at S1 or S2, as the case may be, and the process ends. As described in application Ser. No. 09/679,313, the insertion operation may require use of a split operation.

Deletion Procedure

FIG. 6 illustrates the process of deleting object E from a bottom vertex V. As in the case of the insertion procedure, the process commences at the root or top level VH of the tree at step 200. At step 202, a determination is made as to whether the vertex in question is greater than the zero level. If the level is not greater than 0, indicating that the vertex is in the bottom level, a Bot_Del(V,E) process is formed at step 202 as described in application Ser. No. 09/679,313, and the process ends.

If vertex V is not in the bottom level, a Create_Max(V) procedure is performed at step 206 to distribute the entries between the children vertices of vertex V so that the child vertex having a maximal index has H entries. At step 208, the child vertex is set to the current vertex, and the process loops back to step 202. The process continues to iterate until the bottom level is reached at step 202, whereupon the deletion process described in application Ser. No. 09/679, 313, is performed at step 204. As described in application Ser. No. 09/679,313, the deletion operation may require use of a merge operation.

The present invention thus provides an efficient technique for inserting and deleting entries to a search tree that allows the search engine to reach nearly 100% of memory utilization. More particularly, by limiting the number of vertices having less than H−1 entries to a maximum of one vertex on each level, the computer memory storing the tree is more fully utilized. While the complexity of the insertion and deletion processes is increased over that described in application Ser. No. 09/679,313, the order of magnitude of the complexity remains unchanged, namely equal to the logarithm of the capacity. The frequency of insertion and deletion operations is reduced by the present technique due to the use of a minimum capacity of H−1 (so each vertex has a capacity of either H or H−1) and the more complex operations.

In summary, and as illustrated in FIG. 7, using a search tree having a distribution of entries, such as one described in the above identified applications, a vertex of the tree is selected at step 250. If the vertex is in the bottom level, as identified at step 252, an insert or delete operation is performed at step 254 as described in connection with FIG. 5 or 6 as the case may be. If the vertex is not in the bottom level at step 252, a redistribution process is performed at step 256 on descendant vertices as described in connection with FIG. 4. The redistribution process redistributes the entries of descendant vertices at a given level so that a descendant vertex (for example the child or grandchild vertex) having the maximal index contains a predetermined number of vertices (e.g., H−1). If at step 258 the descendant vertex is in the bottom level, the process ends at step 254 with an insertion or deletion operation on the descendant vertex having the maximal index. Otherwise, the process iteratively redistributes entries among vertices at successive descendant levels (e.g. child or grandchild vertices) of the vertex found in the previous iteration having the maximal index until a descendant vertex is found in the bottom level, whereupon step 254 is performed.

The present invention provides a protocol that allows maximum utilization of the computer memory by the search engine. Consequently, the protocol is more efficient than that described in application Ser. No. 09/679,313. However, the increased efficiency of the present invention is achieved at a cost of increased latency. For this reason, and to minimize latency, it may be desirable to employ the protocol described application Ser. No. 09/679,313 in some cases.

The invention is carried out in a computer operated by a computer readable program code that performs the insertion and deletion of the search tree as described herein. More particularly, the computer readable program code is embedded in a computer, readable memory, such as the hard disk of the computer, and is executed by the computer to cause the computer to construct the search tree and manage the search tree entries as herein described.

Although the present invention has been described with reference to preferred embodiments, workers skilled in the art will recognize that changes may be made in form and detail without departing from the spirit and scope of the invention.

What is claimed is:

1. A process for changing the number of entries in a search tree having a top level, a bottom level and at least one intermediate hierarchy level between the top level and the bottom level, the bottom level containing a plurality of entries distributed among a plurality of vertices so that each vertex of the bottom level contains at least one entry, each bottom level vertex being a child vertex to a vertex of a higher level and each vertex in the top and intermediate hierarchy levels being a parent to at least one vertex in a lower level, the at least one intermediate hierarchy level containing a plurality of entries distributed in at least one vertex, each vertex in at least each intermediate hierarchy and bottom levels having an index, the process comprising steps of:

a) selecting a vertex in a level other than the bottom level and identifying the level of the selected vertex;

b) iteratively redistributing entries between the descendant vertices of the selected vertex on a level so that the descendant vertex having a maximal index contains a predetermined number of entries, each iteration using the descendant vertex having the maximal index found during one iteration for the selected vertex during the next iteration, until a descendant vertex is found in the bottom level; and c) inserting or deleting an entry on the descendant vertex having the maximal index.

2. The process of claim 1, wherein the predetermined number of entries in the descendant vertex after redistribution equals a maximum number of entries for a vertex, and step (c) comprises:

deleting an entry on the descendant vertex in the bottom level having the maximal index.

3. The process of claim 1, wherein the predetermined number of entries in the descendant vertex after redistribution is less than a maximum number of entries for a vertex, and step (c) comprises:

inserting an entry on the descendant vertex in the bottom level having the maximal index.

4. The process of claim 1, wherein the descendant vertices of the selected vertex are child vertices in a level other than the bottom level and step (b) further comprises steps of:

b1) identifying whether the child vertex having the maximal index contains a maximum number of entries, and either b2) if the child vertex contains less than the maximum number of entries, iteratively redistributing entries between child vertices of the selected vertex so that the child vertex having the maximal index contains a predetermined number of entries, each iteration using the child vertex having the maximal index found during one iteration for the selected vertex during the next iteration, until a descendant vertex is found in the bottom level, or b3) if the child vertex contains the maximum number of entries, iteratively redistributing entries between grandchild vertices of the selected vertex so that the grandchild vertex having a maximal index contains a predetermined number of entries, each iteration using the grandchild vertex having the maximal index found during one iteration for the selected vertex during the next iteration, until a descendant vertex is found in the bottom level.

5. The process of claim 4, wherein step (b3) is performed on grandchild vertices that are children of the child vertex of the selected vertex that has a maximal index.

6. The process of claim 1, wherein step (b) comprises steps of:

b1) redistributing entries between child vertices of the selected vertex so that at least all child vertices, other than a child vertex having a maximal index, contain a predetermined number of entries that is less than a maximum number of entries for a vertex, b2) a) if the child vertex having the maximal index does not contain a maximum number of entries, redistributing entries between child vertices of the selected vertex so that the child vertex having the maximal index contains the maximum number of entries, or b) if the child vertex having the maximal index contains a maximum number of entries, redistributing entries between grandchild vertices of the selected vertex that are children of the child vertex having the maximal index so that the grandchild vertex having the maximal index contains the predetermined number of entries, and b3) iteratively repeating step (b) using the child or grandchild vertex having the maximal index for the selected vertex until a vertex is found in the bottom level.

7. In a search tree having a top level, a bottom level and at least one intermediate hierarchy level between the top level and the bottom level, the bottom level containing a plurality of entries distributed among a plurality of vertices so that each vertex of the bottom level contains at least one entry, each bottom level vertex being a child vertex to a vertex of a higher level and each vertex in the top and intermediate hierarchy levels being a parent to at least one vertex in a lower level, apparatus for adding or deleting entries on the tree comprising:

selecting means for selecting a vertex;

level identifying means for identifying whether the level of the selected vertex is the bottom level;

first entry means responsive to the level identifying means identifying that the level of the selected vertex is the bottom level for inserting or deleting an entry on the selected vertex;

redistribution means responsive to the level identifying means identifying that the selected vertex is not on the bottom level for redistributing entries between the descendant vertices of the selected vertex on a level so that the descendant vertex having a maximal index contains a predetermined number of entries; and second entry means responsive to the redistribution means for inserting or deleting an entry on the descendant vertex having the maximal index.

8. The apparatus of claim 7, further including:
iteration means for iterating operation of the level identification means and the redistribution means using the descendant vertex having the maximal index found during one iteration for the selected vertex during the next iteration, until a descendant vertex is found in the bottom level.

9. The apparatus of claim 8, wherein the first and second entry means are each operable to delete an entry from the search tree and the predetermined number of entries in the descendant vertex after redistribution is equal to a maximum number of entries for a vertex.

10. The apparatus of claim 8, wherein the first and second entry means are each operable to insert an entry to the search tree and the predetermined number of entries in the descendant vertex after redistribution is less than a maximum number of entries for a vertex.

11. The apparatus of claim 7, wherein the first and second entry means are each operable to insert an entry to the search tree and the predetermined number of entries in the descendant vertex after redistribution is less than a maximum number of entries for a vertex.

12. The apparatus of claim 11, further including:
second level identifying means for identifying whether the level of a child vertex of the selected vertex is the bottom level,
second redistribution means responsive to the second level identifying means identifying that the child vertex is not on the bottom level for redistributing entries between grandchild vertices of the selected vertex that are children of the child vertex having the maximal index so that the grandchild vertex having a maximal index contains the predetermined number of entries, and
second iteration means for iterating operation of the first and second level identification means and the first and second redistribution means using the child or grandchild vertex having the maximal index found during one iteration for the selected vertex during the next iteration, until a vertex is found in the bottom level.

13. The apparatus of claim 12, wherein the second level identification means includes:
size means for identifying whether the child vertex having the maximal index has less than the maximum number of entries,
the second redistribution means being operable in response to the size means identifying that the child vertex does not have less than the maximum number of entries, and
the first-named redistribution means being operable in response to the size means identifying that the child vertex has less than the maximum number of entries.

14. A computer usable medium having a computer readable program embodied therein for addressing data, the computer readable program in the computer usable medium comprising:
computer readable program code defining a search tree having a plurality of vertices arranged in a plurality of levels with a bottom level containing a plurality of bottom vertices each containing a plurality of entries, a top level containing a root vertex defining an input to the tree, and at least one intermediate level containing a plurality of intermediate hierarchy vertices defining at least a portion of a path between the root vertex and a bottom vertex, a plurality of entries distributed among the intermediate hierarchy vertices of the at least one intermediate level, each entry defining a vertex address of a child vertex in a next lower level to thereby define a portion of the path between the root vertex and a bottom vertex;
computer readable program code for causing a computer to insert entries into, and delete entries from, bottom vertices of the search tree comprising:
first computer code for causing the computer to select a vertex and identify the level of the selected vertex;
second computer code for causing the computer to respond to identification that the level of the selected vertex is not the bottom level to redistribute entries between descendant vertices of the selected vertex on a level so that the descendant vertex having a maximal index contains a predetermined number of entries,
the second computer code further causing the computer to respond to identification that the level of the descendant vertex is the bottom level to insert or delete an entry on the descendant vertex having the maximal index; and
third computer code for causing the computer to respond to identification that the level of the selected vertex is the bottom level to insert or delete an entry on the selected vertex.

15. The computer usable medium of claim 14, wherein the computer readable program code causes the computer to delete an entry from the search tree, and the predetermined number of entries in the descendant vertex after redistribution equals a maximum number of entries for a vertex, the computer readable program code further including:
fourth computer code for causing the computer to re-execute the first and second computer readable program code using the descendant vertex having the maximal index found during one iteration for the selected vertex during the next iteration, until a vertex is found in the bottom level.

16. The computer usable medium of claim 14, wherein the computer readable program code causes the computer to insert an entry into the search tree, and the predetermined number of entries in the descendant vertex after redistribution is less than a maximum number of entries for a vertex, wherein the computer readable program code further includes:
fourth computer code for causing the computer to respond to an identification that the level of a child vertex of the selected vertex is not the bottom level to redistribute entries between grandchild vertices of the selected vertex that are children of the child vertex having the maximal index so that the grandchild vertex having a maximal index contains the predetermined number of entries,
fifth computer code for causing the computer to respond to an identification that the level of the grandchild vertex is the bottom level to execute the second computer code to insert the entry on the grandchild vertex having the maximal index, and
sixth computer code for causing the computer to respond to an identification that the level of the grandchild vertex is not the bottom vertex to re-execute the second and fourth computer codes using the child or grandchild vertex having the maximal index found during one iteration for the selected vertex during the next iteration, until a child or grandchild vertex is found in the bottom level.

17. The computer usable medium of claim 16, wherein the sixth computer code further includes:

seventh computer code for causing the computer to respond to an identification that the child vertex contains less than the maximum number of entries to re-execute the second or fourth computer codes using the child vertex for the selected vertex during the next iteration, and eighth computer code for causing the computer to respond to an identification that the child vertex contains the maximum number of entries to re-execute the second or fourth computer codes using the grandchild vertex for the selected vertex during the next iteration.

18. The computer usable medium of claim 14, wherein the computer readable program code causes the computer to insert an entry into the search tree, and the predetermined number of entries in a child vertex of the selected vertex after redistribution is less than a maximum number of entries for a vertex, wherein the computer readable program code further comprises:

fourth computer code for causing the computer to redistributing entries between child vertices of the selected vertex so that at least all child vertex, other than a child vertex having a maximal index, contains a predetermined number of entries that is less than a maximum number of entries for a vertex, fifth computer code for causing the computer to respond to an identification that the level of the child vertex is the bottom level to insert the entry into the child vertex, sixth computer code for causing the computer to respond to an identification that the level of the child vertex is not the bottom level and that the child vertex does not contain a maximum number of entries to re-execute the first, second and third computer codes using the child vertex for the selected vertex, seventh computer code for causing the computer to respond to an identification that the level of the child vertex is not the bottom level and that the child vertex contains a maximum number of entries to redistribute entries between grandchild vertices of the selected vertex that are children of the child vertex having the maximal index so that the grandchild vertex having the maximal index contains the predetermined number of entries, and eighth computer code for causing the computer to re-execute the first, second, fourth, fifth and sixth computer codes using the grandchild vertex having the maximal index for the selected vertex until the new selected vertex or a child of the new selected vertex is found in the bottom level.

\* \* \* \* \*